United States Patent
Bekele

(10) Patent No.: US 8,394,474 B2
(45) Date of Patent: *Mar. 12, 2013

(54) STERILIZABLE COEXTRUDED FILM FOR ASEPTIC PACKAGING

(75) Inventor: Solomon Bekele, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 2507 days.

This patent is subject to a terminal disclaimer.

(21) Appl. No.: 11/100,739

(22) Filed: Apr. 7, 2005

(65) Prior Publication Data

US 2006/0228502 A1      Oct. 12, 2006

(51) Int. Cl.
  *B32B 27/08*  (2006.01)
(52) U.S. Cl. .............. 428/36.7; 428/34.3; 428/34.6; 428/34.7; 428/34.9; 428/36.6; 428/34.2; 428/511
(58) Field of Classification Search .......... 428/342, 428/34.2, 36.7, 511, 34.3, 34.6, 34.7, 34.9, 428/35.7, 36.6
See application file for complete search history.

(56) References Cited

U.S. PATENT DOCUMENTS

| | | | |
|---|---|---|---|
| 4,746,562 A | 5/1988 | Fant | |
| 4,755,419 A | 7/1988 | Shah | |
| 5,187,012 A | 2/1993 | Takahashi et al. | |
| 5,306,533 A * | 4/1994 | Robichaud et al. | 428/34.2 |
| 5,491,009 A | 2/1996 | Bekele | |
| 5,532,030 A | 7/1996 | Hirose et al. | |
| 5,534,606 A | 7/1996 | Bennett et al. | |
| 6,132,825 A | 10/2000 | Frisk | |
| 6,165,573 A | 12/2000 | Hirose et al. | |
| 6,379,812 B1 | 4/2002 | Hofmeister et al. | |
| 6,500,559 B2 | 12/2002 | Hofmeister et al. | |
| 6,858,313 B2 | 2/2005 | Musco et al. | |
| 6,861,125 B1 | 3/2005 | Carlson et al. | |
| 6,872,462 B2 | 3/2005 | Roberts et al. | |
| 7,029,734 B1 | 4/2006 | Wuest et al. | |
| 7,051,493 B2 | 5/2006 | Cook et al. | |
| 2002/0119334 A1 | 8/2002 | Shepard et al. | |
| 2003/0017352 A1 | 1/2003 | Dayrit et al. | |
| 2004/0175592 A1 * | 9/2004 | Douglas et al. | 428/515 |
| 2004/0247915 A1 | 12/2004 | Wuest et al. | |

FOREIGN PATENT DOCUMENTS

| | | |
|---|---|---|
| EP | 1 300 238 | 9/2002 |
| JP | 2003192017 A | 7/2003 |

OTHER PUBLICATIONS

Elementis Specialties, BENTONE® Nanoclays for Plastics, Oct. 2003, 4 pages.
Dow Plastics, DOW Polyethylene 12450N, Mar. 2004, 1 page, Form No. 305-02180-0304X.
Innovene, Fortiflex® T50-200 Polyethylene Copolymer, Aug. 1, 2005, 1 page.
Total Petrochemicals, Polypropylene EOD01-30, Mar. 2005, 1 page.
Total Petrochemicals, Polypropylene EOD00-07, Jan. 2005, 1 page.
Aseptic Packaging System, 6 pages, Mar. 31, 2005.

* cited by examiner

*Primary Examiner* — Ellen S Wood

(57) ABSTRACT

A coextruded multilayer film includes a core layer including an ethylene vinyl alcohol copolymer; two intermediate layers each including a blend of an amorphous polyamide having a glass transition temperature of at least 80° C., and a semicrystalline polyamide; two outer layers each including an olefinic polymer; and two tie layers each adhering an intermediate layer to a respective outer layer; wherein the film exhibits an elongation at yield (ASTM D 882) of less than 15% in each of the longitudinal and transverse directions, and a free shrink (ASTM D 2732) at 200° F. of less than 8% in each of the longitudinal and transverse directions. An aseptic package includes a sterilized food product, and a sterilized pouch in which the sterilized food product is disposed, the sterilized pouch including the coextruded multilayer film of the invention. A method of making an aseptic package is also disclosed.

9 Claims, No Drawings

STERILIZABLE COEXTRUDED FILM FOR ASEPTIC PACKAGING

FIELD OF THE INVENTION

The invention relates to a coextruded film for aseptic packaging, and to an aseptic package.

BACKGROUND OF THE INVENTION

Aseptic food packaging is a well known method of packaging foods for which sterilization of the food and the packaging material containing the food is required. It is known to produce sterilized packaging in which a sterile food product is placed in a sterilized container such as a pouch. The food product is thus preserved for later storage or use. Various methods of sterilizing the container, and filling the container with a pasteurized product, are known. Hydrogen peroxide is a common medium for sterilization of the packaging material.

In aseptic packaging applications such as vertical form fill seal pouch packaging, where hydrogen peroxide sterilization treatments are used, some films can unduly stretch, rendering these films less desirable or unsuitable for this end use application where dimensional stability of the packaging material is of concern.

One current commercial packaging material for aseptic applications provides such dimensional stability, but in manufacture requires that various components of the material be laminated together. This is a relatively costly means of producing packaging materials.

SUMMARY OF THE INVENTION

In a first aspect of the present invention, a coextruded multilayer film comprises a core layer comprising an ethylene vinyl alcohol copolymer; two intermediate layers each comprising a blend of an amorphous polyamide having a glass transition temperature of at least 80° C., and a semicrystalline polyamide; two outer layers each comprising an olefinic polymer; and two tie layers each adhering an intermediate layer to a respective outer layer; wherein the film exhibits an elongation at yield (ASTM D 882) of less than 15% in each of the longitudinal and transverse directions, and a free shrink (ASTM D 2732) at 200° F. of less than 8% in each of the longitudinal and transverse directions.

In a second aspect of the present invention, an aseptic package comprises a sterilized food product, and a sterilized pouch in which the sterilized food product is disposed, the sterilized pouch comprising a coextruded multilayer film comprising a core layer comprising an ethylene vinyl alcohol copolymer; two intermediate layers each comprising a blend of an amorphous polyamide having a glass transition temperature of at least 80° C. and a semicrystalline polyamide; two outer layers each comprising an olefinic polymer; and two tie layers each adhering an intermediate layer to a respective outer layer; wherein the film exhibits an elongation at yield (ASTM D 882) of less than 15% in each of the longitudinal and transverse directions, and a free shrink (ASTM D 2732) at 200° F. of less than 8% in each of the longitudinal and transverse directions.

In a third aspect of the present invention, a method of making an aseptic package comprises sterilizing a food product; sterilizing a coextruded film, the film comprising a core layer comprising ethylene vinyl alcohol copolymer, two intermediate layers each comprising a blend of an amorphous polyamide having a glass transition temperature of at least 80° C., and a semicrystalline polyamide, two outer layers each comprising an olefinic polymer, and two tie layers each adhering an intermediate layer to a respective outer layer, wherein the film exhibits an elongation at yield (ASTM D 882) of less than 15% in each of the longitudinal and transverse directions, and a free shrink (ASTM D 2732) at 200° F. of less than 8% in each of the longitudinal and transverse directions; forming the sterilized film into a pouch; filling the pouch with the sterilized food product; and sealing the pouch.

DEFINITIONS

"Aseptic" herein refers to a process wherein a sterilized container or packaging material, e.g. a pre-made pouch or a pouch constructed in a vertical form/fill/seal process, is filled with a sterilized food product, in a hygienic environment. The food product is thus rendered shelf stable in normal nonrefrigerated conditions. "Aseptic" is also used herein to refer to the resulting filled and closed package. The package or packaging material and the food product are typically separately sterilized before filling.

"High density polyethylene" is an ethylene homopolymer or copolymer with a density of 0.940 g/cc or higher.

"Polypropylene" is a propylene homopolymer or copolymer having greater than 50 mole percent propylene prepared by conventional heterogeneous Ziegler-Natta type initiators or by single site catalysis. Propylene copolymers are typically prepared with ethylene or butene comonomers.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ and ATTANE™ resins supplied by Dow, and ESCORENE™ resins supplied by Exxon; as well as linear homogeneous ethylene/alpha olefin copolymers (HEAO) such as TAFMER™ resins supplied by Mitsui Petrochemical Corporation, EXACT™ and EXCEED™ resins supplied by Exxon, long chain branched (HEAO) AFFINITY™ resins and ELITE™ resins supplied by the Dow Chemical Company, ENGAGE™ resins supplied by DuPont Dow Elastomers, and SURPASS™ resins supplied by Nova Chemicals.

"Ethylene homopolymer or copolymer" herein refers to ethylene homopolymer such as low density polyethylene; ethylene/alpha olefin copolymer such as those defined herein; ethylene/vinyl acetate copolymer; ethylene/alkyl acrylate copolymer; ethylene/(meth)acrylic acid copolymer; or ionomer resin.

"Film" herein means a film, laminate, sheet, web, coating, or the like, which can be used to package an oxygen sensitive product. The film can be used as a component in a rigid, semi-rigid, or flexible product, and can be adhered to a non-polymeric or non-thermoplastic substrate such as paper or metal. The film can also be used as a coupon or insert within a package.

"Multicomponent ethylene/alpha-olefin interpenetrating network resin" or "IPN resin" herein refers to multicomponent molecular mixtures of polymer chains. Because of molecular mixing, IPN resins cannot be separated without breaking chemical bonds. Polymer chains combined as IPN resins are interlaced at a molecular level and are thus considered true solid state solutions. Interpenetrating networks, unlike blends, become new compositions exhibiting properties distinct from parent constituents. Interpenetrating networks provide phase co-continuity leading to surprising enhancement of physical properties. Due to the mixture of at least two molecular types, these compositions may exhibit bimodal or multimodal curves when analyzed using TREF or CRYSTAF. Interpenetrating networks as herein used includes semi-interpenetrating networks and therefore describes crosslinked and uncrosslinked multicomponent molecular mixtures having a low density fraction and a high density fraction.

"Olefinic" and the like herein refers to a polymer or copolymer derived at least in part from an olefinic monomer.

"Polyamide" herein refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as polymers of diamines and diacids, and copolymers of two or more amide monomers, including nylon terpolymers, also referred to generally as "copolyamides" herein.

"Polymer" and the like herein means a homopolymer, but also copolymers thereof, including bispolymers, terpolymers, etc.

All compositional percentages used herein are presented on a "by weight" basis, unless designated otherwise.

DETAILED DESCRIPTION OF THE INVENTION

The Aseptic Process

Aseptic packaging typically involves the sterilization of liquid foods and beverages outside the package, and separate sterilization of the packaging material, to produce a shelf stable package. Ultra high temperature is used to rapidly heat the food product, followed by cooling of the product, before the product is put into the pouch or other container formed from the packaging material. Processing times for the product are generally 3 to 15 seconds; temperatures range from about 195° F. to 285° F.

Film Sterilization

An example of a commercially available aseptic form/fill/seal equipment system is the ONPACK™ KAF 2000 system having a film sterilization section including a tank for hydrogen peroxide, a drying chamber, a form/fill/seal section, and a unit which supplies and circulates hydrogen peroxide and controls temperature, air pressure etc. Film is continuously sterilized by hydrogen peroxide set at a temperature of between 60° C. and 80° C. in a chemical tank. After film leaves this tank, hot air at a temperature of between 60° C. and 80° C. is used to dry out the film to remove hydrogen peroxide from the film. Temperature and flow level for the hydrogen peroxide is controlled by steam to raise temperature, and water is supplied for cooling. Piping between the food sterilizer and the packaging unit can be initially sterilized using steam heat or hot water. After film exits the peroxide tank, the film is scraped by plates and by an air knife to make it easy to dry.

| | | Film Embodiments of the Invention Film Structure | | | | |
|---|---|---|---|---|---|---|
| PO | Tie | Amorphous nylon + $2^{nd}$ nylon | EVOH | Amorphous nylon + $2^{nd}$ nylon | Tie | PO |
| A | B | C | D | E | F | G |

Core layer D of the above film structure can comprises any suitable EVOH material, and can be blended in any proportion with other polymeric materials or organic or inorganic additives as desired.

Intermediate layers C and E each comprise a blend of an amorphous polyamide and a semicrystalline polyamide. The semicrystalline polyamide can be any suitable polyamide, including nylon 6.

The amorphous polyamide can comprise any suitable percent of the overall polyamide blend, and can comprise e.g. less than 50 wt. %, such as less than 40 wt. %, and less than 30 wt. % of the polyamide blend of layers C and E. The amorphous polyamide can comprise from 5 to 45 wt. %, such as from 20 to 40 wt. %, such as from 25 to 35 wt. % of the polyamide blend of layers C and E. The blend ratios of layers C and E can be the same, or can differ.

Useful commercially available amorphous polyamides include FE4494™ and FE4495™. These are PA6I/66/69 polyamides available from EMS. Also useful is FE7103™, a PA6I/MXDI polyamide available from EMS.

Other amorphous polyamides that can be used are PA66/6T; PA66/6I; PA66I/66T; PA6/6T; and PA6/6I. Also useful is PA6/3/T available from Degussa as TROGAMID™, and PA6I/6T available from DuPont as SELAR™ PA 3426.

The amorphous polyamide has a glass transition temperature of at least 80° C.

The semicrystalline polyamide can comprise any suitable percent of the overall polyamide blend, and can comprise e.g. more than 50 wt. %, such as more than 60 wt. %, and more than 70 wt. % of the polyamide blend of layers C and E. The semicrystalline polyamide can comprise from 55 to 95 wt. %, such as from 60 to 80 wt. %, such as from 65 to 75 wt. % of the polyamide blend of layers C and E.

The semicrystalline polyamide has a glass transition temperature of at least 55° C.

Tie layers B and F can comprise any suitable polymeric adhesive that functions to bond two layers together. Materials that can be used in embodiments of the present invention include e.g. ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; and anhydride grafted ethylene/methyl acrylate copolymer. Tie layers B and F can be the same, or can differ. The choice of tie layers depends at least in part on the choice of polymer for the outer layers A and G.

At least one of the outer layers A and G of the film will typically function as a sealant layer of the film. These layers can comprise one or more olefinic polymers. Polymers that may be used for the outer layers include various polyolefin copolymers including ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, high density polyethylene, propylene homopolymer, propylene/ethylene copolymer, or blends of any of these materials. Outer layers A and G can be the same, or can differ.

Pouches made from the film of the present invention can be fin sealed or lap sealed (typically referring to the longitudinal seal running the length of the pouch) depending on the desired configuration of the finished pouch, the equipment used, and the composition of the two outer layers. In the case of fin seals, where the same outer layer is sealed to itself at the longitudinal edges of the material web, it is desirable to have the outer layer that will come together to form the fin seal to comprise a material with a melting point of at least 125° C., e.g. high density polyethylene or propylene homopolymer.

Additional materials that can be incorporated into one or both of the outer layers of the film, and in other layers of the film as appropriate, include antiblock agents, slip agents, antifog agents, etc.

Other additives can also be included in the composition to impart properties desired for the particular article being manufactured. Such additives include, but are not necessarily limited to, fillers, pigments, dyestuffs, antioxidants, stabilizers, processing aids, plasticizers, fire retardants, UV absorbers, etc.

Additional materials, including polymeric materials or other organic or inorganic additives, can be added to any or all of the layers of the above structures as needed, and additional film layers can be included either within the film structure, or adhered to an outer layer thereof.

In general, the film can have any total thickness desired, and each layer can have any thickness desired, so long as the film provides the desired properties for the particular packaging operation in which the film is used. Typical total thicknesses are from 0.5 mils to 15 mils, such as 1 mil to 12 mils, such as 2 mils to 10 mils, 3 mils to 8 mils, and 4 mils to 6 mils.

Examples

Several film structures in accordance with the invention, and comparatives, are identified below. Materials used were as follows.

TABLE 1

| Resin Identification | | |
|---|---|---|
| Material Code | Tradename Or Designation | Source(s) |
| AB1 | 10850 | Ampacet |
| AB2 | 10853 | Colortech |
| PE1 | DOW ™609A | Dow |

TABLE 1-continued

| Resin Identification | | |
|---|---|---|
| Material Code | Tradename Or Designation | Source(s) |
| PE2 | DOWLEX ™ 2045.04 | Dow |
| PE3 | ELITE ™ 5400 G | Dow |
| PE4 | FORTIFLEX ™ T60-500-119 | BP |
| AD1 | PX3236 ™ | Equistar |
| PA1 | ULTRAMID ™B35FN | BASF |
| PA2 | ULTRAMID ™B40 01 | BASF |
| PA3 | GRIVORY ™G21 | EMS |
| OB1 | EVAL ™ L171B | Evalca |
| PP1 | ESCORENE PP-9302 E1 | ExxonMobil |
| PP2 | FINACENE ™EOD 01 03 | Total Petrochemicals |

AB1 is a masterbatch having about 86%, by weight of the masterbatch, of linear low density polyethylene, and about 13%, by weight of the masterbatch, of an antiblocking agent (diatomaceous earth).

AB2 is a masterbatch having about 80%, by weight of the masterbatch, of linear low density polyethylene, and about 20%, by weight of the masterbatch, of an antiblocking agent (diatomaceous earth).

PE1 is a low density polyethylene resin.

PE2 is a linear low density polyethylene, which in this case is an ethylene/1-octene copolymer with a density of 0.920 gm/cc and an octene-1 comonomer content of 6.5%.

PE3 is an IPN resin with a density of 0.917 grams/cc, and a melt flow index of 1.0.

PE4 is a high density polyethylene with a density of 0.961 grams/cc.

AD1 is a maleic anhydride-modified linear low density polyethylene with a density of 0.921 grams/cc.

PA1 is a nylon 6 (poly(caprolactam)).

PA2 is a nylon 6 (poly(caprolactam)).

PA3 is an amorphous nylon, i.e. a poly(hexamethylene diamine/isophthalic acid/terephthalic acid).

OB1 is an ethylene/vinyl alcohol copolymer with less than 30 mole % ethylene.

PP1 is a propylene/ethylene copolymer with about 3% ethylene by weight of the copolymer.

PP2 is a metallocene catalyzed isotactic propylene/ethylene copolymer with about 1.3% to 1.5% ethylene by weight of the copolymer.

All compositional percentages given herein are by weight, unless indicated otherwise.

The following films were made by otherwise conventional coextrusion techniques.

TABLE 2

| | Film structures | | | | | | |
|---|---|---|---|---|---|---|---|
| | | | | Layers | | | |
| Example | A | B | C | D | E | F | G |
| Comp. 1 | 5% AB1 + 25% PE1 + 70% PE2 | AD1 | PA1 | OB1 | PA1 | AD1 | 5% AB1 + 25% PE1 + 70% PE2 |
| Mils | 1.38 | 0.54 | 0.55 | 0.55 | 0.55 | 0.55 | 1.38 |
| Vol % | 25.1 | 9.80 | 10.0 | 10.0 | 10.0 | 10.0 | 25.1 |
| Ex. 1 | 7% AB2 + 23% PE1 + 70% PE2 | AD1 | 70% PA2 + 30% PA3 | OB1 | 70% PA2 + 30% PA3 | AD1 | 7% AB2 + 23% PE1 + 70% PE2 |
| Mils | 1.38 | 0.54 | 0.55 | 0.55 | 0.55 | 0.55 | 1.38 |
| Vol % | 25.1 | 9.80 | 10.0 | 10.0 | 10.0 | 10.0 | 25.1 |
| SG | 0.925 | 0.92 | 1.152 | 1.20 | 1.152 | 0.92 | 0.925 |
| Ex. 2 | 7% AB2 + 23% PE1 + 70% PE2 | AD1 | 55% PA2 + 45% PA3 | OB1 | 55% PA2 + 45% PA3 | AD1 | 7% AB2 + 23% PE1 + 70% PE2 |

TABLE 2-continued

Film structures

| | Layers | | | | | | |
|---|---|---|---|---|---|---|---|
| Example | A | B | C | D | E | F | G |
| Mils | 1.38 | 0.54 | 0.55 | 0.55 | 0.55 | 0.55 | 1.38 |
| Vol % | 25.1 | 9.80 | 10.0 | 10.0 | 10.0 | 10.0 | 25.1 |
| SG | 0.925 | 0.92 | 1.158 | 1.20 | 1.158 | 0.92 | 0.925 |
| Ex. 3 | 7% AB2 + 23% PE1 + 70% PE3 | AD1 | 70% PA2 + 30% PA3 | OB1 | 70% PA2 + 30% PA3 | AD1 | 7% AB2 + 23% PE1 + 70% PE3 |
| Mils | 1.20 | 0.20 | 0.45 | 0.30 | 0.45 | 0.20 | 1.20 |
| Vol % | 30.0 | 5.0 | 11.25 | 7.5 | 11.25 | 5.0 | 30.0 |
| SG | 0.925 | 0.92 | 1.152 | 1.20 | 1.152 | 0.92 | 0.925 |
| Ex. 4 | 7% AB2 + 23% PE1 + 70% PE3 | AD1 | 70% PA2 + 30% PA3 | OB1 | 70% PA2 + 30% PA3 | AD1 | 5% AB2 + 95% PE4 |
| Mils | 1.90 | 0.20 | 0.45 | 0.30 | 0.45 | 0.20 | 0.50 |
| Vol % | 47.5 | 5.0 | 11.25 | 7.5 | 11.25 | 5.0 | 12.5 |
| SG | 0.925 | 0.92 | 1.152 | 1.20 | 1.152 | 0.92 | 0.925 |
| Ex. 5 | 7% AB2 + 23% PE1 + 70% PE3 | AD1 | 70% PA2 + 30% PA3 | OB1 | 70% PA2 + 30% PA3 | AD1 | 5% AB2 + 95% PP1 |
| Mils | 1.90 | 0.20 | 0.45 | 0.30 | 0.45 | 0.20 | 0.50 |
| Vol % | 47.5 | 5.0 | 11.25 | 7.5 | 11.25 | 5.0 | 12.5 |
| SG | 0.925 | 0.92 | 1.152 | 1.20 | 1.152 | 0.92 | 0.925 |
| Ex. 6 | 7% AB2 + 23% PE1 + 70% PE3 | AD1 | 70% PA2 + 30% PA3 | OB1 | 70% PA2 + 30% PA3 | AD1 | 7% AB2 + 93% PP2 |
| Mils | 1.90 | 0.20 | 0.45 | 0.30 | 0.45 | 0.20 | 0.50 |
| Vol % | 47.5 | 5.0 | 11.25 | 7.5 | 11.25 | 5.0 | 12.5 |
| SG | 0.925 | 0.92 | 1.152 | 1.20 | 1.152 | 0.92 | 0.925 |

Notes to Table 2:
1. "Comp." refers to a comparative example.
2. "Ex." refers to an example of the invention.
3. The thickness of each layer, in mils (one mil = .001 inches) is indicated.
4. S.G. is specific gravity.

TABLE 3

Tensile and Elongation Properties
Tests done per ASTM D638, D882

| Examples | Elongation at Yield [%] MD TD | Tensile at Break, [psi] MD TD | Elongation at Break [%] MD TD |
|---|---|---|---|
| Comparative Example 1 | 19 | 5430 | 470 |
| | 17 | 5280 | 470 |
| Comparative Example 2* | Could Not Be Measured | 7950 | 150 |
| | | 7700 | 120 |
| Example 1: | 7.1 | 6710 | 480 |
| | 6.9 | 6430 | 480 |
| Example 2: | 7.1 | 6630 | 500 |
| | 7.1 | 6290 | 480 |
| Example 3: | 8.5 | 5960 | 470 |
| | 8.1 | 5700 | 480 |
| Example 4: | 8.3 | 5890 | 470 |
| | 8.7 | 5720 | 460 |
| Example 5: | 11 | 5880 | 480 |
| | 10 | 5730 | 500 |
| Example 6: | 8.7 | 5950 | 480 |
| | 8.3 | 5710 | 480 |

*Comparative Example 2 of Table 3 was a commercial laminate in which biaxially oriented nylon 6 film is laminated by a conventional lamination adhesive such as polyurethane to a discrete multilayer substrate film having the construction:

| LDPE | Adh | PA6 | Adh | HDPE | PE | EVOH | LDPE | HDPE |
|---|---|---|---|---|---|---|---|---|
| 2.2 | 0.10 | 0.70 | 0.08 | 0.20 | 0.10 | 0.15 | 0.10 | 0.20 |

Where the values below each resin are the layer gauge in mils, and where:

LDPE = low density polyethylene

Adh = polymeric adhesive

PA6 = nylon 6

HDPE = high density polyethylene

PE = polyethylene

EVOH = ethylene/vinyl alcohol copolymer

Examples 1 through 6 exhibited low percent elongation at yield and thus were found not to stretch after they were immersed in a hydrogen peroxide bath held at from 60° C. to 80° C. for a period of a few minutes to a few hours.

Comparative Example 1 has elongation at yield higher than the films of the invention and thus exhibited some stretching after being dipped in the peroxide for only a few minutes.

Comparative Example 2 exhibited close to zero percent elongation at yield and could therefore not be measured.

Films of the invention are characterized by an elongation at yield (ASTM D 882) of less than 15%, such as less than 12%, and less than 10%, in each of the longitudinal and transverse directions. Films of the invention can have an elongation at yield (ASTM D 882) of from 5% to 14%, such as from 6% to 12%, and from 8% to 10%, in each of the longitudinal and transverse directions.

Films of the invention are characterized by a free shrink (ASTM D 2732) at 200° F. of less than 8%, such as less than 6%, and less than 5%, in each of the longitudinal and transverse directions.

What is claimed is:

1. An aseptic vertical form/fill/seal package comprises:
   a) a sterilized food product, and
   b) a sterilized vertical form/fill/seal pouch in which the sterilized food product is disposed, the sterilized pouch comprising a coextruded multilayer film comprising
      i) a core layer comprising ethylene vinyl alcohol copolymer;
      ii) two intermediate layers each comprising a blend of
         (a) an amorphous polyamide having a glass transition temperature of at least 80° C., and
         (b) a semicrystalline polyamide;
      iii) two outer layers each comprising an olefinic polymer; and
      iv) two tie layers each adhering an intermediate layer to a respective outer layer;
   wherein the film exhibits
      (a) an elongation at yield (ASTM D 882) of less than 15% in each of the longitudinal and transverse directions, and
      (b) a free shrink (ASTM D 2732) at 200° F. of less than 8% in each of the longitudinal and transverse directions.

2. The aseptic package of claim 1 wherein the ethylene vinyl alcohol copolymer has less than 30 mole % ethylene.

3. The aseptic package of claim 1 wherein the semicrystalline polyamide comprises nylon 6.

4. The aseptic package of claim 1 wherein at least one of the outer layers comprises a material selected from the group consisting of:
   a) a blend of low density polyethylene and linear low density polyethylene;
   b) a blend of low density polyethylene and an ethylene/alpha-olefin interpenetrating network resin;
   c) propylene/ethylene copolymer;
   d) high density polyethylene; and
   e) propylene homopolymer.

5. The aseptic package of claim 1 wherein the tie layers each comprise an anhydride grafted polymer.

6. The aseptic package of claim 1 wherein the film exhibits an elongation at yield (ASTM D 882) of less than 15% in each of the longitudinal and transverse directions.

7. The aseptic package of claim 1 wherein the film exhibits an elongation at yield (ASTM D 882) of between 1 and 15% in each of the longitudinal and transverse directions.

8. The aseptic package of claim 1 wherein the sterilized pouch comprises a lap seal.

9. The aseptic package of claim 1 wherein the sterilized pouch comprises a fin seal.

* * * * *